(12) United States Patent
Schaefferkoetter et al.

(10) Patent No.: US 12,725,334 B2
(45) Date of Patent: Sep. 1, 2026

(54) ATTENUATION CORRECTION FACTOR GENERATION

(71) Applicant: Siemens Medical Solutions USA, Inc., Malvern, PA (US)

(72) Inventors: Joshua Schaefferkoetter, Knoxville, TN (US); Paul Schleyer, Knoxville, TN (US); Yifan Zheng, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 280 days.

(21) Appl. No.: 18/667,279

(22) Filed: May 17, 2024

(65) Prior Publication Data

US 2025/0356544 A1 Nov. 20, 2025

(51) Int. Cl.
*G06T 12/10* (2026.01)
*G06T 12/20* (2026.01)

(52) U.S. Cl.
CPC .............. *G06T 12/10* (2026.01); *G06T 12/20* (2026.01); *G06T 2210/41* (2013.01); *G06T 2211/441* (2023.08)

(58) Field of Classification Search
None
See application file for complete search history.

(56) References Cited

U.S. PATENT DOCUMENTS

| | | | | |
|---|---|---|---|---|
| 11,302,003 | B2 | 4/2022 | Liu et al. | |
| 2022/0091286 | A1* | 3/2022 | Panin | A61B 6/037 |
| 2022/0207791 | A1* | 6/2022 | Shi | G06N 3/088 |
| 2023/0009528 | A1* | 1/2023 | Schaefferkoetter | G06T 12/10 |
| 2024/0233213 | A1* | 7/2024 | Qiang | A61B 6/037 |
| 2025/0252619 | A1* | 8/2025 | Ding | G06T 12/10 |

FOREIGN PATENT DOCUMENTS

| | | | |
|---|---|---|---|
| WO | WO-2024253692 A1 * | 12/2024 | G06N 3/084 |

OTHER PUBLICATIONS

Arabi, H., & Zaidi, H. (2020). Deep learning-guided estimation of attenuation correction factors from time-of-flight PET emission data. Medical image analysis, 64, 101718. (Year: 2020).*

Hwang et al. (2019). Generation of PET attenuation map for whole-body time-of-flight 18F-FDG PET/MRI using a deep neural network trained with simultaneously reconstructed activity and attenuation maps. Journal of Nuclear Medicine, 60(8), 1183-1189. (Year: 2019).*

Leynes, A. P., . . . & Larson, P. E. (2017). Direct pseudoCT generation for pelvis PET/MRI attenuation correction using deep convolutional neural networks with multi-parametric MRI: zero echo-time and Dixon deep pseudoCT (ZeDD-CT). Journal of Nuclear Medicine. (Year: 2017).*

(Continued)

*Primary Examiner* — Ian L Lemieux

(57) ABSTRACT

A framework for medical image data processing. An attenuation correction factor (ACF) map is generated by applying the raw emission data directly to one or more artificial neural networks. A medical image may then be reconstructed from the ACF map.

20 Claims, 4 Drawing Sheets

(56) References Cited

OTHER PUBLICATIONS

Kobayashi, T., Shigeki, Y., Yamakawa, Y., Tsutsumida, Y., Mizuta, T., Hanaoka, K., . . . & Ishii, K. (Jan. 2024). Generating PET Attenuation Maps via Sim2Real Deep Learning-Based Tissue Composition Estimation Combined with MLACF. Journal of Imaging Informatics in Medicine, 37(1), 167-179. (Year: 2024).*

International Search Report and Written Opinion for PCT Application No. PCT/US2023/068163 dated Oct. 11, 2023 (Year: 2023).*

Panin, V. Y., Panir, E. E., Bharkhada, D., & Whiteley, W. (Oct. 2020). Histo-projections TOF data non-rigid motion estimation and correction. In 2020 IEEE Nuclear Science Symposium and Medical Imaging Conference (NSS/MIC) (pp. 1-5). IEEE. (Year: 2020).*

Matej, S., Surti, S., Jayanthi, S., Daube-Witherspoon, M. E., Lewitt, R. M., & Karp, J. S. (2009). Efficient 3-D TOF PET reconstruction using view-grouped histo-images: DIRECT—Direct image reconstruction for TOF. IEEE Transactions on medical imaging, 28(5), 739-751. (Year: 2009).*

Feng, T., Yao, S., Xi, C., Zhao, Y., Wang, R., Wu, S., . . . & Xu, B. (2021). Deep learning-based image reconstruction for TOF PET with DIRECT data partitioning format. Physics in Medicine & Biology, 66(16), 165007. (Year: 2021).*

Salimi, Yazdan, et al. "Direct generation of pseudo-CT images from non-attenuation/scatter corrected PET images for CT-less attenuation/scatter correction." (Journal of Nuclear Medicine Jun. 2022): 3266-3266.

Li, Qingneng, et al. "Eliminating CT radiation for clinical PET examination using deep learning." European Journal of Radiology 154 (2022): 110422.

* cited by examiner

ATTENUATION CORRECTION FACTOR GENERATION

TECHNICAL FIELD

The present disclosure generally relates to medical image data processing, and more particularly, to a framework for generating attenuation correction factors.

BACKGROUND

The field of medical imaging has seen significant advances since the time X-Rays were first used to determine anatomical abnormalities. Medical imaging hardware has progressed in the form of newer machines such as Medical Resonance Imaging (MRI) scanners, Computed Axial Tomography (CAT) scanners, etc. Digital medical images are constructed using raw image data obtained from such scanners. Digital medical images are typically either a two-dimensional ("2-D") image made of pixel elements or a three-dimensional ("3-D") image made of volume elements ("voxels"). Because of large amounts of image data generated in any given scan, there has been and remains a need for developing image processing techniques that can automate some or all of the processes to determine the presence of anatomical abnormalities in scanned medical images.

Multimodality (or hybrid) imaging plays an important role in accurately identifying diseased and normal tissues. Multimodality imaging provides combined benefits by fusing images acquired by different modalities. The complementarity between anatomic (e.g., computed tomography (CT), magnetic resonance (MR)) and molecular (e.g., positron-emission tomography (PET), single-photon emission computerized tomography (SPECT)) imaging modalities, for instance, has led to the widespread use of PET/CT and SPECT/CT imaging.

Attenuation correction (AC) needs to be performed in order to produce quantitatively accurate reconstructed images from multimodality image data. Without attenuation correction, significant artifacts may occur in the reconstructed images. Attenuation correction may be performed by estimating the attenuation map (u-map), which represents the spatial distribution of tissue attenuation coefficients within the PET field of view. The intensities in the attenuation map represent the linear attenuation coefficient (LAC) values. The attenuation coefficient is used to describe how different media (e.g., bone, soft tissue, air) interact with the imaging radiation.

The measured CT image volume in PET/CT imaging may be directly converted to 511 keV attenuation coefficient (u) values to correct for photon-attenuation effects. A segmentation-based attenuation map for PET/MR imaging may be generated from a multi-point MR Dixon sequence. For PET/MR, the generated attenuation maps are notoriously problematic due to tissue misclassification, truncation and incomplete or incorrect bone atlas addition. For PET/CT, there is a growing interest in application-specific imaging protocols (e.g., neuro, cardiac) and/or population-specific imaging protocols (e.g., pediatric) that may not otherwise need an acquired CT scan.

SUMMARY

Described herein is a framework for medical image data processing. An attenuation correction factor (ACF) map is generated by applying the raw emission data directly to one or more artificial neural networks. A medical image may then be reconstructed from the ACF map.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

Figure 1:
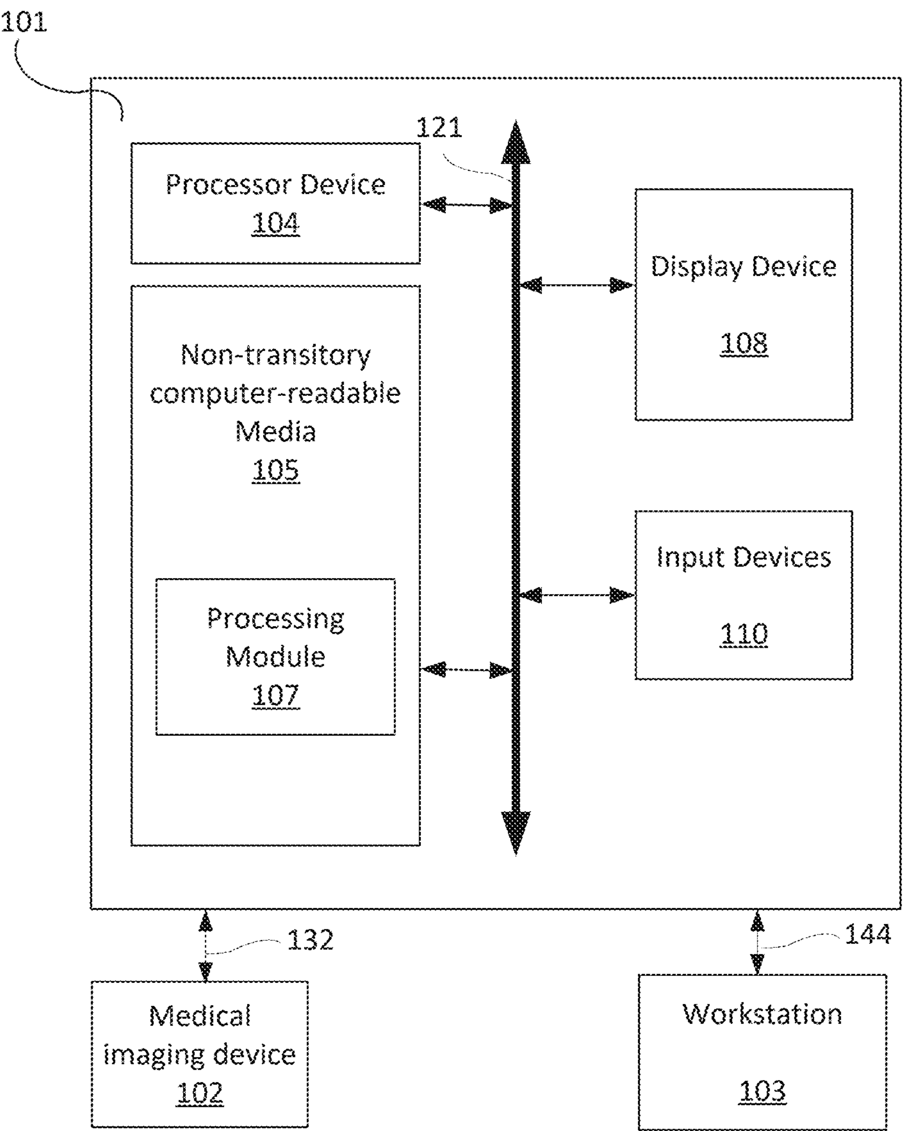
FIG. 1 shows a block diagram illustrating an exemplary system.

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

For brevity, an image, or a portion thereof (e.g., a region of interest (ROI) in the image) corresponding to an object (e.g., a tissue, an organ, a tumor, etc., of a subject (e.g., a patient, etc.)) may be referred to as an image, or a portion of thereof (e.g., an ROI) of or including the object, or the object itself. For instance, an ROI corresponding to the image of a lung or a heart may be described as that the ROI includes a lung or a heart. As another example, an image of or including a chest may be referred to a chest image, or simply a chest. For brevity, that a portion of an image corresponding to an object is processed (e.g., extracted, segmented) may be described as the object is processed. For instance, that a portion of an image corresponding to a lung is extracted from the rest of the image may be described as that the lung is extracted.

Deep learning techniques have demonstrated the efficacy for artificial intelligence (AI) for the task of attenuation correction. However, previous work has performed attenuation map (or u-map) synthesis in the image domain, by transforming a reconstructed PET image into a pseudo-CT or attenuation coefficient map (or u-map) image.

A framework for attenuation correction is presented herein. In accordance with one aspect, deep artificial neural networks (e.g., convolutional neural networks or CNNs) are trained to generate a map of attenuation correction factors (ACF) directly from raw emission data (e.g., PET projection data), without requiring any image reconstruction (e.g., pseudo-CT image or u map reconstruction). In some implementations, the present framework directly generates the ACF map in PET data projection space (e.g. sinograms or histo-projections). Therefore, the synthesized ACF map is advantageously already in the format required by the attenuation correction process in the downstream image reconstruction.

The present framework is advantageously faster and more efficient than conventional image-based methods, since it does not require a reconstructed image as input, but rather, generates the ACF maps directly from the raw emission data. These and other exemplary advantages and features will be described in more details in the following description.

FIG. 1 is a block diagram illustrating an exemplary system 100. The system 100 includes a computer system 101 for implementing the framework as described herein. In some implementations, computer system 101 operates as a standalone device. In other implementations, computer system 101 may be connected (e.g., using a network) to other machines, such as medical imaging device 102 and workstation 103. In a networked deployment, computer system 101 may operate in the capacity of a server (e.g., in a server-client user network environment, a client user machine in server-client user network environment, or as a peer machine in a peer-to-peer (or distributed) network environment).

In one implementation, computer system 101 includes a processor device or central processing unit (CPU) 104 coupled to one or more non-transitory computer-readable media 105 (e.g., computer storage or memory device), display device 108 (e.g., monitor) and various input devices 110 (e.g., mouse, touchpad or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In some implementations, the techniques described herein are implemented as computer-readable program code tangibly embodied in one or more non-transitory computer-readable media 105. In particular, the present techniques may be implemented by a processing module 107. Non-transitory computer-readable media 105 may include random access memory (RAM), read-only memory (ROM), magnetic floppy disk, flash memory, and other types of memories, or a combination thereof. The computer-readable program code is executed by processor device 104 to process data provided by, for example, medical imaging device 102. As such, the computer system 101 is a general-purpose computer system that becomes a specific-purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein. The same or different computer-readable media 105 may be used for storing a database, including, but not limited to, image datasets, a knowledge base, individual subject data, medical records, diagnostic reports (or documents) for subjects, or a combination thereof.

Medical imaging device 102 acquires image data 132. Such image data 132 may be processed by processing module 107. Medical imaging device 102 may be a radiology scanner (e.g., nuclear medicine scanner) and/or appropriate peripherals (e.g., keyboard and display device) for acquiring, collecting and/or storing such image data 132. Medical imaging device 102 may be a hybrid modality designed for acquiring image data using at least one anatomic imaging modality (e.g., CT, MR) and at least one molecular imaging modality (e.g., SPECT, PET). Medical imaging device 102 may be, for instance, a PET/CT, SPECT/CT or PET/MR scanner. Alternatively, medical imaging device 102 may include a single modality (e.g., PET, SPECT).

Workstation 103 may include a computer and appropriate peripherals, such as a keyboard and display device, and can be operated in conjunction with the entire system 100. For example, workstation 103 may communicate with medical imaging device 102 so that the medical image data 132 can be presented or displayed at the workstation 103. The workstation 103 may communicate directly with the computer system 101 to display processed data and/or output results 144. The workstation 103 may include a graphical user interface to receive user input via an input device (e.g., keyboard, mouse, touch screen, voice or video recognition interface, etc.) to manipulate visualization and/or processing of the data.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 2:
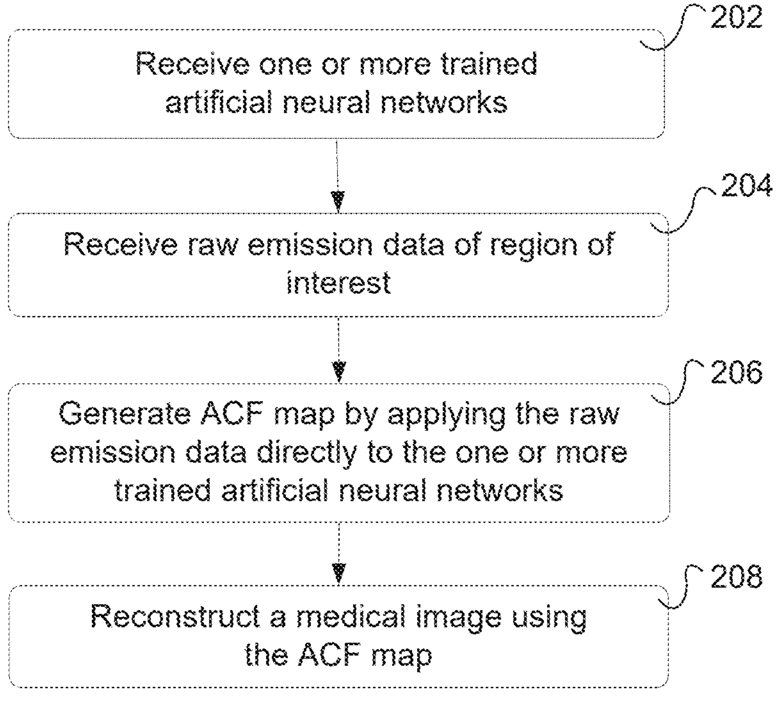
FIG. 2 shows an exemplary method of medical image processing.

FIG. 2 shows an exemplary method 200 of medical image processing. It should be understood that the steps of the method 200 may be performed in the order shown or a different order. Additional, different, or fewer steps may also be provided. Further, the method 200 may be implemented with the system 100 of FIG. 1, a different system, or a combination thereof.

At 202, processing module 107 receives one or more trained artificial neural networks (ANNs). The one or more artificial neural networks may be trained to generate an attenuation correction factor (ACF) map directly from raw emission data. Raw emission data generally refers to non-reconstructed data (e.g., raw PET data), including, but not limited to, listmode data, sinograms, histo-projection data, or histo-image data.

The intensities in the ACF map represent spatially varying correction factors (or linear attenuation coefficients) that account for the attenuation of emitted radiation (e.g., 511 keV photons) within the patient's body. The one or more artificial neural networks may include one or more deep neural networks, such as a single convolutional neural network (CNN) or recurrent neural network. The one or more artificial neural networks may include any architecture, such as the U-Net or the residual block network.

Figure 3:
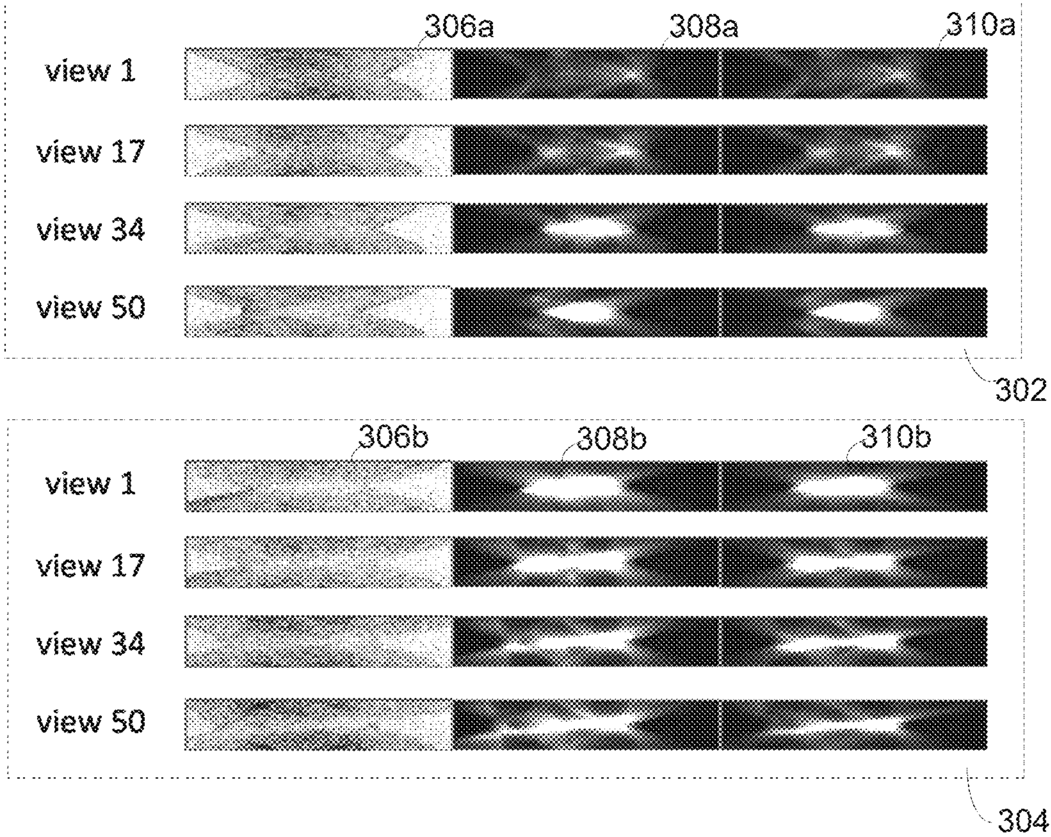
FIG. 3 shows an exemplary set of training data and an exemplary set of test data.

FIG. 3 shows an exemplary set of training data 302 and an exemplary set of test data 304. The training data set 302 is used to train the one or more ANNs, and includes sets of corresponding raw emission data 306*a*, actual ACF maps 308*a* for various projection views or angles and synthetic ACF maps 310*a*. The actual ACF maps 308*a* may be derived from measured attenuation data. In some implementations, the actual ACF maps 308*a* are derived by scaling corresponding anatomic image volumes (e.g., CT or MR) to 511 keV attenuation coefficients. The scaled image volumes may then be forward projected for all views (i.e. in the projection space) and exponentially scaled to obtain the actual ACF maps 308*a*. Synthetic ACF maps 310*a* are generated by the one or more ANNs based on the raw emission data 306*a*. The actual ACF maps 308*a* serve as ground truth during supervised training of the one or more ANNs. More particularly, the weights of the one or more ANNs may be adjusted based on the differences between the actual ACF maps 308*a* and the synthetic ACF maps 310*a*.

The test data 304 includes raw emission data 306*b* for various projection views or angles, actual AC maps 308*b* and synthetic ACF maps 310*b*. Synthetic ACF maps 310*b* are generated by the one or more trained ANNs based on raw emission data 306*b*. Strong similarity is shown between the actual ACF maps 308*b* and the synthetic ACF maps 310*b*.

Returning to FIG. 2, at 204, processing module 107 receives raw emission data of a region of interest of a subject or patient. The region of interest may be any area identified for further study, such as the heart or lungs. The raw (or non-reconstructed) emission data may be acquired by medical imaging device 102. Medical imaging device 102 may include a molecular imaging modality (e.g., PET, SPECT) that directly acquires raw emission data of the region of interest.

Emissions from one or more radionuclides injected into the subject's bloodstream are detected from multiple view angles. The energies, positions, times, times-of-flight and/or orders of arrival of emissions from the one or more radionuclides may be measured by the medical imaging device 102 and recorded as raw emission data. More particularly, in PET imaging, the signal is produced by the annihilation of an emitted positron with an electron in the surrounding medium or tissue. Positron annihilation may lead to the production of two 511 keV photons emitted almost back-to-back that are detected in time coincidence by the surrounding PET detectors in the medical imaging device 102 to form a line-of-response (LOR). TOF PET measures the difference in arrival times of these two photons, thereby localizing the emission point along the LOR. Such localization improves spatial resolution and reduces image noise.

In some implementations, the raw emission data is organized into a sinogram that captures the projection of the image from various angles. Each row in the sinogram may represent the sum of events along the corresponding line of response (LOR). Sinograms may be separated by the time-of-flight (TOF) information recorded with each event. In other implementations, the raw emission data is organized into histo-projection or histo-image data, which involves spatially localizing each LOR event using time-of-flight (TOF) information. Angular compression of data may be applied. Other formats of raw emission data are also useful.

At 206, image processing module 117 generates an ACF map by applying as input the raw emission data directly to the one or more trained artificial neural networks (ANNs). In some implementations, the at least one first neural network generates an ACF map of for each PET projection bin. Multiple ACF maps may be generated by applying raw emission data over multiple projection bins to the one or more trained ANNs. Time-of-flight (TOF) information may be incorporated in the projection bins, such that all events that occur along one LOR are not just described by a single sinogram coordinate. TOF information may be used to identify where the event occurred along the LOR.

Figure 4:
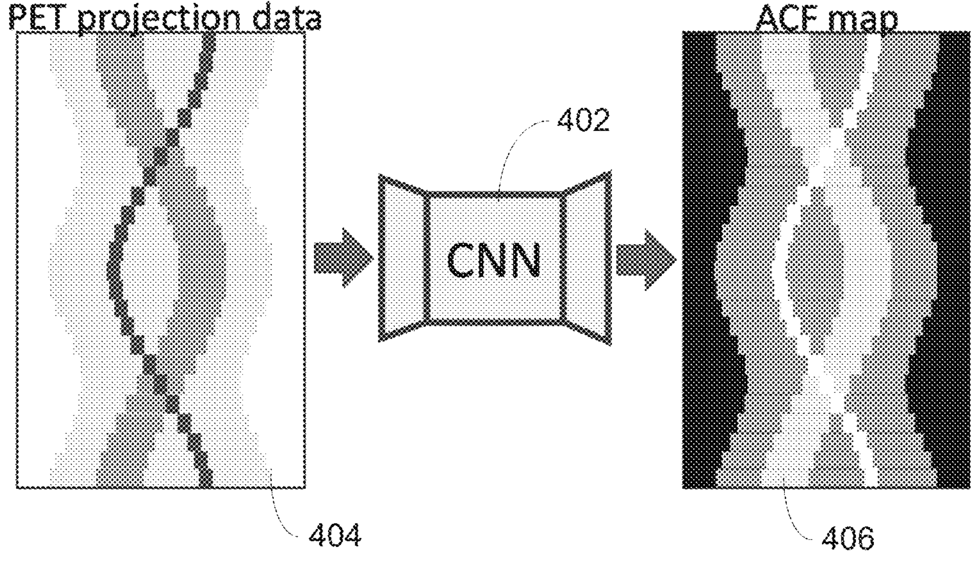
FIG. 4 shows an exemplary convolutional neural network (CNN).

FIG. 4 shows an exemplary convolutional neural network (CNN) 402. PET projection data 404 is applied directly to CNN 402 to generate an ACF map 406, without the use of any pseudo-CT or u-map.

Returning to FIG. 2, at 208, image processing module 117 performs image reconstruction using the ACF map generated by the one or more trained ANNs. The ACF map may be used to reconstruct an attenuation-corrected medical image (e.g., PET image). The ACF map may be directly applied within the image reconstruction algorithm to correct for attenuation. In some implementations, the attenuation-corrected medical image may be reconstructed using a direct image reconstruction method, such as filtered back projection. Other types of image reconstruction methods, such as iterative methods (e.g. maximum likelihood expectation maximization or MLEM) or ordered subset expectation maximization (OSEM), may also be used. The reconstructed image may be displayed at, for example, workstation 103.

The following is a list of non-limiting illustrative embodiments disclosed herein:

Illustrative embodiment 1. An image processing system, comprising: a non-transitory memory device for storing computer readable program code; and a processor device in communication with the non-transitory memory device, the processor device being operative with the computer readable program code to perform steps including receiving one or more artificial neural networks, receiving raw emission data of a region of interest, generating an attenuation correction factor (ACF) map by applying the raw emission data directly to the one or more artificial neural networks, and reconstructing a medical image by using the ACF map.

Illustrative embodiment 2. The image processing system of illustrative embodiment 1 wherein the medical image comprises a positron-emission tomography (PET) or single-photon emission computerized tomography (SPECT) image.

Illustrative embodiment 3. The image processing system of any one of illustrative embodiments 1-2 wherein the one or more artificial neural networks comprise a single convolutional neural network.

Illustrative embodiment 4. The image processing system of any one of illustrative embodiments 1-3 wherein the one or more artificial neural networks comprise a U-Net or residual block network.

Illustrative embodiment 5. The image processing system of any one of illustrative embodiments 1~4 wherein the one or more artificial neural networks are trained using sets of corresponding raw emission data and actual ACF maps.

Illustrative embodiment 6. The image processing system of any one of illustrative embodiments 1-5 wherein the raw emission data comprises one or more sinograms separated by time-of-flight information.

Illustrative embodiment 7. The image processing system of any one of illustrative embodiments 1-6 wherein the raw emission data comprises histo-projection or histo-image data.

Illustrative embodiment 8. The image processing system of any one of illustrative embodiments 1-7 the processor device is operative with the computer readable program code to generate the ACF map by applying the raw emission data over multiple projection bins directly to the one or more artificial neural networks to generate multiple ACF maps.

Illustrative embodiment 9. An image processing method, comprising: receiving one or more artificial neural networks; receiving raw emission data of a region of interest; generating an attenuation correction factor (ACF) map by applying the raw emission data directly to the one or more artificial neural networks; and reconstructing a medical image by using the ACF map.

Illustrative embodiment 10. The image processing method of illustrative embodiment 9 wherein the medical image comprises a positron-emission tomography (PET) or single-photon emission computerized tomography (SPECT) image.

Illustrative embodiment 11. The image processing method of any one of illustrative embodiments 9-10 wherein the one or more artificial neural networks comprise a single convolutional neural network.

Illustrative embodiment 12. The image processing method of any one of illustrative embodiments 9-11 wherein the one or more artificial neural networks comprise a U-Net or residual block network.

Illustrative embodiment 13. The image processing method of any one of illustrative embodiments 9-12 further comprises training the one or more artificial neural networks using sets of corresponding raw emission data and actual ACF maps.

Illustrative embodiment 14. The image processing method of any one of illustrative embodiments 9-13 wherein the raw emission data comprises one or more sinograms.

Illustrative embodiment 15. The image processing method of any one of illustrative embodiments 9-14 wherein the raw emission data comprises histo-projection or histo-image data.

Illustrative embodiment 16. The image processing method of any one of illustrative embodiments 9-15 wherein generating the ACF map comprises applying the raw emission data over multiple projection bins directly to the one or more artificial neural networks to generate multiple ACF maps.

Illustrative embodiment 17. One or more non-transitory computer-readable media embodying instructions executable by a machine to perform operations comprising: receiving one or more artificial neural networks; receiving raw emission data of a region of interest; generating an attenuation correction factor (ACF) map by applying the emission projection data directly to the one or more artificial neural networks; and reconstructing a medical image by using the ACF map.

Illustrative embodiment 18. The one or more non-transitory computer-readable media of illustrative embodiment 17 wherein the operations further comprise training the one or more artificial neural networks using sets of corresponding raw emission data and actual ACF maps.

Illustrative embodiment 19. The one or more non-transitory computer-readable media of any one of illustrative embodiments 17-18 wherein the raw emission data comprises one or more sinograms, histo-projection or histo-image data.

Illustrative embodiment 20. The one or more non-transitory computer-readable media of any one of illustrative embodiments 17-19 wherein generating the ACF map comprises applying the raw emission data over multiple projection bins directly to the one or more artificial neural networks to generate multiple ACF maps.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. An image processing system, comprising:

a non-transitory memory device for storing computer readable program code; and a processor device in communication with the non-transitory memory device, the processor device being operative with the computer readable program code to perform steps including (i) receiving one or more artificial neural networks, (ii) receiving raw emission data of a region of interest, wherein the raw emission data comprises histo-projection data in which each line-of-response event is spatially localized using time-of-flight information to identify a position of the line-of-response event, (iii) generating an attenuation correction factor (ACF) map for each of a plurality of projection views by applying, for each projection view, the raw emission data corresponding to that projection view directly to the one or more artificial neural networks, and (iv) reconstructing a medical image by using the ACF map.

2. The image processing system of claim 1 wherein the medical image comprises a positron-emission tomography (PET) or single-photon emission computerized tomography (SPECT) image.

3. The image processing system of claim 1 wherein the one or more artificial neural networks comprise a single convolutional neural network.

4. The image processing system of claim 1 wherein the one or more artificial neural networks comprise a U-Net or residual block network.

5. The image processing system of claim 1 wherein the one or more artificial neural networks are trained using sets of corresponding raw emission data and actual ACF maps.

6. The image processing system of claim 1 wherein the raw emission data comprises one or more sinograms separated by time-of-flight information.

7. The image processing system of claim 1 wherein angular compression is applied on the histo-projection data.

8. The image processing system of claim 1 the processor device is operative with the computer readable program code to reconstruct the medical image by directly applying the ACF map to a filtered back projection algorithm.

9. An image processing method, comprising:

receiving one or more artificial neural networks;

receiving raw emission data of a region of interest, wherein the raw emission data comprises histo-projection data in which each line-of-response event is spatially localized using time-of-flight information to identify a position of the line-of-response event;

generating an attenuation correction factor (ACF) map for each of a plurality of projection views by applying, for each projection view, the raw emission data corresponding to that projection view directly to the one or more artificial neural networks; and reconstructing a medical image by using the ACF map.

10. The image processing method of claim 9 wherein the medical image comprises a positron-emission tomography (PET) or single-photon emission computerized tomography (SPECT) image.

11. The image processing method of claim 9 wherein the one or more artificial neural networks comprise a single convolutional neural network.

12. The image processing method of claim 9 wherein the one or more artificial neural networks comprise a U-Net or residual block network.

13. The image processing method of claim 9 further comprises training the one or more artificial neural networks by applying training histo-projection data to the one or more artificial neural networks to generate synthetic ACF maps, and adjusting weights of the one or more artificial neural networks based on differences between the synthetic ACF maps and actual ACF maps derived from measured attenuation data.

14. The image processing method of claim 9 wherein the raw emission data comprises one or more sinograms.

15. The image processing method of claim 9 wherein the raw emission data comprises histo-projection or histo-image data.

16. The image processing method of claim 9 wherein reconstructing the medical image comprises directly applying the ACF map to a filtered back projection algorithm.

17. One or more non-transitory computer-readable media embodying instructions executable by a machine to perform operations comprising:

receiving one or more artificial neural networks;

receiving raw emission data of a region of interest, wherein the raw emission data comprises histo-projection data in which each line-of-response event is spatially localized using time-of-flight information to identify a position of the line-of-response event;

generating an attenuation correction factor (ACF) map for each of a plurality of projection views by applying, for each projection view, the raw emission data corresponding to that projection view directly to the one or more artificial neural networks; and reconstructing a medical image by using the ACF map.

18. The one or more non-transitory computer-readable media of claim 17 wherein the operations further comprise training the one or more artificial neural networks by applying training histo-projection data to the one or more artificial neural networks to generate synthetic ACF maps, and adjusting weights of the one or more artificial neural networks based on differences between the synthetic ACF maps and actual ACF maps derived from measured attenuation data.

19. The one or more non-transitory computer-readable media of claim 17 wherein the raw emission data comprises one or more sinograms, histo-projection or histo-image data.

20. The one or more non-transitory computer-readable media of claim 17 wherein reconstructing the medical image comprises directly applying the ACF map to a filtered back projection algorithm.

* * * * *